United States Patent [19]

Lehner et al.

[11] Patent Number: 4,567,109

[45] Date of Patent: Jan. 28, 1986

[54] MAGNETIC RECORDING MEDIA

[75] Inventors: August Lehner, Roedersheim-Gronau; Milan Velic, Ludwigshafen; Helmut Kopke, Weisenheim; Werner Balz, Limburgerhof; Werner Lenz, Bad Durkheim; Reinhold Baur, Offenburg; Milena Melzer, Ludwigshafen, all of Fed. Rep. of Germany

[73] Assignee: BASF Aktiengesellschaft, Fed. Rep. of Germany

[21] Appl. No.: 515,463

[22] Filed: Jul. 20, 1983

[30] Foreign Application Priority Data

Jul. 21, 1982 [DE] Fed. Rep. of Germany ....... 3227161
Jul. 21, 1982 [DE] Fed. Rep. of Germany ....... 3227163

[51] Int. Cl.$^4$ ................................................ G11B 5/70
[52] U.S. Cl. ............................ 428/425.9; 252/62.54; 360/134; 360/135; 360/136; 427/128; 428/522; 428/524; 428/532; 428/694; 428/900
[58] Field of Search ............... 428/900, 694, 425.9, 428/524, 522, 532; 252/62.54; 360/134–136

[56] References Cited

U.S. PATENT DOCUMENTS

| 2,871,218 | 1/1959 | Schollenberger | 528/76 |
| 2,899,411 | 8/1959 | Schollenberger | 260/77.5 |
| 3,149,995 | 9/1964 | Bauer | 428/694 |
| 3,150,995 | 9/1964 | Bauer | 428/694 |
| 3,247,017 | 4/1966 | Eichler | 428/694 |
| 3,320,090 | 5/1967 | Graubert | 428/694 |
| 3,558,353 | 1/1971 | Harada | 428/694 |
| 4,058,646 | 11/1977 | Vaeth | 428/694 |
| 4,234,438 | 11/1980 | Horigome | 252/62.54 |
| 4,320,171 | 3/1982 | Motz | 428/423.1 |
| 4,328,282 | 5/1982 | Lehner | 428/694 |
| 4,368,238 | 1/1983 | Somezawa | 428/694 |

FOREIGN PATENT DOCUMENTS

| 814225 | 9/1951 | Fed. Rep. of Germany . |
| 2753694 | 12/1977 | Fed. Rep. of Germany . |
| 3226011 | 7/1982 | Fed. Rep. of Germany . |
| 3217212 | 11/1982 | Fed. Rep. of Germany . |
| 2101911 | 7/1983 | United Kingdom . |

OTHER PUBLICATIONS

H. Fikentscher, "Systematik der Cellulosen auf Grund ihrer Viskositat in Losung", *Cellulosechemie*, Nr. 3, (193), pp. 58–64.

*Primary Examiner*—Ellis P. Robinson
*Attorney, Agent, or Firm*—Keil & Weinkauf

[57] ABSTRACT

Magnetic recording media comprising a non-magnetic base which is provided with a magnetic layer which consists essentially of a dispersion of an anisotropic magnetic material in a mixture of an OH-containing polyurea-urethane binder, which is crosslinked with a polyisocyanate, with a physically drying binder.

4 Claims, No Drawings

MAGNETIC RECORDING MEDIA

The present invention relates to magnetic recording media which comprise a non-magnetic base which is provided with a magnetic layer consisting of finely divided anisotropic magnetic material dispersed in a binder, wherein the binder is a mixture of two organic polymers.

Magnetic recording media are used for the recording and playback of audio and video signals and data. The constantly increasing demands made on these recording media call for further improvements in their magnetic and electroacoustic properties. For example, the trend toward higher recording densities in the case of all the above fields of application makes the production of thinner magnetic layers necessary. For this reason, the packing density of the magnetic material in the magnetic layer and the remanence in the recording direction must be considerably increased, and the distribution of the magnetic material in the layer, and the surface smoothness and homogeneity of the layer must be greatly improved, since the faithful recording of signals makes great demands on the quality of a magnetic layer. A magnetic layer must be capable of recording and reproducing both high- and low-frequency signals without any variation in their amplitude.

In order to achieve these properties, it is necessary not only that the magnetic pigment should be distributed very uniformly in the organic binder, but also that the magnetic layer should be magnetically very sensitive in the recording direction. The anisotropy of the acicular pigment particles is utilized to achieve a high orientation ratio. The liquid dispersion comprising the magnetic pigment and the organic binder solution is applied as a coating to an inert base and is then exposed to a magnetic field, so that the magnetizable needles are oriented in the recording direction. This procedure is followed directly by a drying operation, in which the particles in the binder are locked in their oriented positions. A measure of the degree of particle orientation achieved, and hence of the sensitivity of the recording medium, is the ratio of the residual induction $B_R$ to the saturation induction $B_S$ of the dry magnetic layer, measured in the recording direction.

The distribution of the magnetic particles in the organic binder and their orientation by the magnetic field are effected by the nature of the polymer employed, the effect being particularly pronounced when a finely divided pigment is used. There is a wide choice of organic binders, and combinations thereof, for magnetic powders. Examples of conventional binders include polyacrylates, nylons, polyesters, polyurethanes, phenoxy resins, vinyl chloride/acrylonitrile copolymers and copolymers of vinyl chloride, vinyl acetate and vinyl alcohol. The majority of the polymers listed are relatively hard and brittle, whereas the usual mechanical stressing of the magnetic layer requires an elastomeric, frequently relatively soft, formulation. Therefore, polyurethane elastomers are frequently combined with relatively brittle polymers, such as phenoxy resins, vinyl chloride/vinyl acetate copolymers, polycarbonates, etc., or plasticizers are introduced into the layer. Such polyurethanes are prepared by reacting hydroxyl-containing polyethers or polyesters with polyisocyanates. Usually, polyester-urethane elastomers as described in, for example, German Published Application DAS 1,106,959, or polyether-urethane elastomers as described in U.S. Pat. No. 2,899,411, are employed. To improve the tape running properties, the above polymer mixtures are frequently crosslinked with polyisocyanates. Hence, the hard resins employed also frequently possess OH groups.

However, the disadvantages of using these binder systems are the high solvent demand, the long dispersing time and the 2-stage dispersing procedure required. Furthermore, the particular properties of the magnetic materials are not satisfactorily displayed in these binders. This is evident from the fact that the resulting recording media have a low orientation ratio, low remanence and hence poor sensitivity at short and long wavelengths, and an unsatisfactory maximum output level.

German Pat. No. 814,225 describes the use of bifunctional or higher functional polyoxy compounds, preferably polyesters, which still possess hydroxyl groups, in combination with polyisocyanates. The substances mentioned in that publication, however, do not form films but are low molecular weight products and hence tend to block before they have reacted completely.

To overcome the disadvantages of German Pat. No. 814,225, German Published Application DAS 1,130,612 proposes mixing 5-25% of a high-polymeric physically drying surface coating binder with the polyester-polyisocyanate binder. However, the process has the disadvantage that an additional binder component is required, with the result that the preparation process is lengthened by a further step. Moreover, a 2-stage milling operation is required in order to achieve optimum properties. German Published Application DAS 1,283,282 is similar to German Published Application DAS 1,130,612, except that in the former rubber is added to the polyester-urethane binder.

In German Published Application DAS 1,571,128, the binder contains from 0 to 75 percent by weight of a polymeric matrix material, the remainder being an elastomer. The polymeric matrix material used comprises one or more copolymers selected from a group consisting of soluble hydroxyl-containing resins having a molecular weight of not less than 2,000.

In choosing the conventional binder systems, it was the object in each case to overcome or at least mitigate disadvantages and deficiencies, such as long dispersing time, two-stage dispersing procedure, poor pigment wetting, high solvent demand during the production of the dispersion, low orientation ratio, poor sensitivity at short and long wavelengths, low maximum output level at long and short wavelengths and inadequate signal-to-print-through ratio of the recording layers. With regard to obtaining optimum properties, the solutions proposed hitherto are either inadequate or successful in only some cases.

It is an object of the present invention to provide magnetic recording media which possess improved electroacoustic properties, in particular with regard to sensitivity and maximum output level at long and short wavelengths, as a result of the use of suitable binders which permit the magnetic material to be dispersed in a short time in a small amount of solvent by a one-stage procedure.

We have found that this object is achieved, and that magnetic recording media which comprise a magnetic layer which is applied to a non-magnetic base and consists of a dispersion of an anisotropic magnetic material in a mixture of two organic polymers satisfy the requirements set, if the binder mixture consists of Component 1, which is a low molecular weight OH-containing polyurea-urethane which has an OH number of from 30 to 160 and is obtained from 1.IA 1 mole of a polydiol having a molecular weight of from 400 to 4,000, 1.IB from 0.2 to 10 moles of a diol of 2 to 18 carbon atoms, 1.IC from 0.1 to 4 moles of a primary or secondary aminoalcohol of 2 to 20 carbon atoms, and 1.II from 1.20 to 13 moles of a diisocyanate of 6 to 30 carbon atoms, the proportion of NCO groups in the diisocyanate being from 65 to 95%, based on Components 1.IA to 1.IC, of the equivalent amount of OH and NH groups, with the proviso that the non-pigmented crosslinked film has a tensile strength greater than 15 N/mm², an elongation at break greater than 50%, a modulus of elasticity greater than 150 N/mm² and a pendulum hardness of from 30 to 140 sec, and Component 2, which is a physically drying binder.

Binder mixtures which are equally suitable for the purpose of the invention are those in which Component 1 is obtained from 1.IA 1 mole of a polydiol having a molecular weight of from 400 to 4,000, 1.IB from 0.2 to 9 moles of a diol of 2 to 18 carbon atoms, 1.IC from 0.1 to 4 moles of a primary or secondary aminoalcohol of 2 to 20 carbon atoms, 1.ID from 0.01 to 1 mole of a triol of 3 to 18 carbon atoms, and 1.II from 1.25 to 13 moles of a diisocyanate of 6 to 30 carbon atoms, the proportion of NCO groups in the diisocyanate being from 65 to 95%, based on Components 1.IA to 1.ID, of the equivalent amount of OH and NH groups, and Component 2 has the composition given below.

A suitable Component 2 for the binder mixture of the novel magnetic recording medium is a high molecular weight thermoplastic linear polyurethane which is soluble in tetrahydrofuran and is obtained from 2.A 1 mole of a polyesterol having a molecular weight of from 400 to 4,000, 2.B from 0.3 to 15 moles of a straight-chain aliphatic diol of 2 to 10 carbon atoms, 2.C from 0 to 1.5 moles of a triol of 3 to 10 carbon atoms and from 1.25 to 17 moles of a diisocyanate of 6 to 30 carbon atoms, the amount of NCO groups being about equivalent to the amount of OH groups in Components 2.A, 2.B and 2.C together, with the proviso that the non-pigmented film has a tensile strength of from 40 to 95 N/mm² and an elongation at break of from 100 to 1,400%, and in which the ratio of Component 1 to Component 2 is from 9:1 to 1:9.

In an equally advantageous manner, it is also possible to use, as Component 2, a polyvinyl-formal binder containing not less than 65% of vinyl formal groups, or a copolymer of 50-95% by weight of vinyl chloride and 5-50% by weight of a monoester or diester of an aliphatic diol of 2 to 4 carbon atoms with acrylic acid or methacrylic acid, or a phenoxy resin of the formula

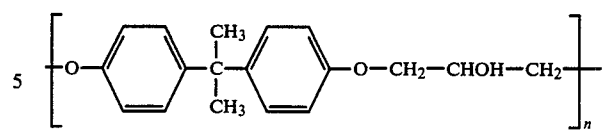

where n is about 100, or a diester and/or triester of cellulose with one or more carboxylic acids of 1 to 4 carbon atoms, the ratio of Component 1 to Component 2 being from 1:0.8 to 1:0.1 in these cases.

The OH-containing polyurea-urethane binders which are crosslinked with the polyisocyanates and can be used for the novel recording media possess, as non-pigmented films, a tensile strength (according DIN 53,455) greater than 15, preferably greater than 30, N/mm², an elongation at break (according to DIN 53,455) greater than 30%, preferably greater than 70%, a modulus of elasticity (according to DIN 53,457) greater than 150, preferably greater than 200, N/mm², and a pendulum hardness (according to DIN 53,157) of from 30 to 140, preferably from 50 to 110, sec. The OH number of Component 1 is from 30 to 160, preferably from 40 to 120, the number average molecular weight is from 1,500 to 40,000 (corresponding to a K value of from 17 to 45), preferably from 2,500 to 25,000 (corresponding to a K value of from 19 to 35).

In the structure of these polymers, it has proved advantageous if some of the OH terminal groups, preferably more than 70%, in particular more than 90%, are present in the radicals:

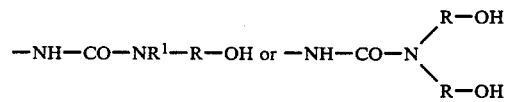

where R is $-(CH_2)-_n$, $R^1$ is H, $-CH_3$ or $-(CH_2)_n-CH_3$ and n is from 1 to 10.

Polymers having this structure are less thermoplastic than those without these terminal groups. Moreover, such a structure permits an increase in the content of terminal OH groups, with the result that when crosslinking with polyisocyanate is effected, the degree of crosslinking can be varied within wide limits, according to the demands made on the magnetic layer. The urea groups, which increase the dispersibility of conventional magnetic materials, are also of advantage.

To prepare Component 1, a polydiol having a molecular weight of from 400 to 4,000, preferably from 700 to 2,500, is employed as Component 1.IA, suitable compounds being the conventional polyesterols, polyetherols, polycarbonates and polycaprolactones.

Advantageously, the polyesterols are predominantly linear polymers which have terminal OH groups, preferably 2 such groups, and an acid number of less than 10, preferably less than 3. The polyesterols can be obtained in a simple manner by esterifying an aliphatic dicarboxylic acid of 4 to 12, preferably 4 to 6, carbon atoms with an aliphatic glycol, preferably one of 2 to 12 carbon atoms, or by polymerizing lactones of 3 to 6 carbon atoms. Examples of suitable aliphatic dicarboxylic acids are glutaric acid, pimelic acid, suberic acid, sebacic acid, dodecanedioic acid and preferably adipic acid and succinic acid. The dicarboxylic acids can be used individually or as a mixture. In preparing the polyesterols, it may be advantageous to replace the dicarboxylic acids with the corresponding acid derivatives, such as a carboxylic acid ester where the alcohol radical is of 1 to 4 carbon atoms, a carboxylic anhydride or a carboxylic acid chloride. Examples of suitable glycols are diethylene glycol, pentanediol, decane-1,10-diol and 2,2,4-trimethylpentane-1,5-diol, but ethane-1,2-diol, butane-1,4-diol, hexane-1,6-diol and 2,2-dimethylpropane-1,3-diol are preferably used. Depending on the desired properties of the polyurethanes, the polyols can be used either alone or mixed together in various proportions. Suitable lactones for the preparation of the polyesterols are $\alpha,\alpha$-dimethyl-$\beta$-propiolactone, $\gamma$-butyrolactone and preferably $\epsilon$-caprolactone.

The polyetherols are essentially linear substances which possess ether bonds and terminal hydroxyl groups and have a molecular weight of about 600–4,000, preferably 1,000–2,000. Suitable polyetherols can be readily prepared by polymerizing a cyclic ether, eg. tetrahydrofuran, or by reacting one or more alkylene oxides, where alkylene is of 2 to 4 carbon atoms, with an initiator whose molecule contains two bonded active hydrogen atoms. Examples of alkylene oxides are ethylene oxide, 1,2-propylene oxide, epichlorohydrin, 1,2-butylene oxide and 2,3-butylene oxide. The alkylene oxides can be used individually, in succession or as a mixture. Examples of suitable initiators are water, glycols, eg. ethylene glycol, propylene glycol, butane-1,4-diol and hexane-1,6-diol, amines, eg. ethylenediamine, hexamethylenediamine and 4,4'-diaminodiphenylmethane, and aminoalcohols, eg. ethanolamine. Like the polyesterols, the polyetherols, too, can be used either alone or as a mixture.

Diols of 2 to 18, preferably 2 to 6, carbon atoms, eg. ethane-1,2-diol, propane-1,3-diol, butane-1,4-diol, hexane-1,6-diol, pentane-1,5-diol, decane-1,10-diol, 2-methylpropane-1,3-diol, 2,2-dimethylpropane-1,3-diol, 2,2-dimethylbutane-1,4-diol, 2-methyl-2-butylpropane-1,3-diol, neopentylglycol hydroxypivalate, diethylene glycol, triethylene glycol and methyldiethanolamine, are employed as Component 1.IB.

In order to obtain novel recording media possessing special properties, it is advantageous if, in the preparation of the OH-containing polyurea-urethane, Component 1.IB consists completely or partially of a diamine of 2 to 15 carbon atoms, eg. ethylenediamine, hexamethylene-1,6-diamine, 4,9-dioxadodecane-1,12-diamine or 4,4'-diaminodiphenylmethane, or an aminoalcohol, eg. monoethanolamine, monoisopropanolamine or 4-methyl-4-aminopentan-2-ol.

Similarly, the diol used as Component 1.IB may furthermore be completely or partially replaced by water or by the primary or secondary aminoalcohols listed below for Component 1.IC.

These aminoalcohols (Component 1.IC) of 2 to 20, preferably 3 to 6, carbon atoms include monoethanolamine, diethanolamine, monoisopropanolamine, diisopropanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)-aniline. Secondary aminoalcohols are particularly suitable since they form an adduct at the chain end and hence improve the solubility of the polymer. Methylethanolamine, diethanolamine and diisopropanolamine have proved particularly advantageous.

The triols used (Component 1.ID) are compounds of 3 to 18, preferably 3 to 6, carbon atoms, examples of appropriate compounds being glycerol, trimethylolpropane and hexanetriol. Low molecular weight reaction products, for example of glycerol or trimethylolpropane with ethylene oxide and/or propylene oxide, are also suitable. The presence of triols during the polyaddition leads to a branched end product; this branching is advantageous for the mechanical properties of the polyurethane, provided that localized crosslinking does not take place.

For the formation of the OH-containing polyureaurethanes, the components listed under 1.I are reacted with an aliphatic, cycloaliphatic or aromatic diisocyanate of 6 to 30 carbon atoms (Component 1.II). Particularly suitable compounds for this purpose are toluylene 2,4-diisocyanate, toluylene 2,6-diisocyanate, m-phenylene diisocyanate, 4-chlorophenylene 1,3-diisocyanate, naphthylene 1,5-diisocyanate, hexamethylene 1,6-diisocyanate, cyclohexylene 1,4-diisocyanate, tetrahydronaphthylene 1,5-diisocyanate, diphenylmethane diisocyanate, dicyclohexylmethane diisocyanate and isophorone diisocyanate. The OH-containing polyurethanes based on toluylene diisocyanate and isophoron diisocyanate are readily soluble in tetrahydrofuran and dioxane.

Components 1.I and 1.II are employed in the following ratio: from 1.20 to 13 moles of diisocyanate, from 0.2 to 10, preferably from 0.5 to 5, moles of the straight-chain aliphatic diol of 2 to 18 carbon atoms and, if appropriate, from 0.01 to 1, preferably from 0.15 to 0.5, mole of triol can be employed per mole of polydiol. The amount of straight-chain diol used depends partly on the molecular weight of the polydiol employed. The isocyanate should be present in an amount which is 5–35% less than the stoichiometric amount, based on the amounts of NH-containing or hydroxyl-containing compounds, so that at the end of the reaction there is virtually no free, unreacted isocyanate present, while free, unreacted hydroxyl groups remain. However, for practical reasons it is often advantageous, in a preliminary reaction of Components 1.IA, 1.IB, 1.IC and 1.II, to use an excess of diisocyanate of from 5 to 40%, preferably from 10 to 30%, based on the amount required for complete conversion of the reactants, so that the ratio of the number of hydroxyl groups employed to the number of isocyanate groups in this reaction stage is from about 1:1.05 to 1:1.4, preferably from about 1:1.1 to 1:1.30. In the second reaction stage, Component 1.IC is then added in an amount such that the number of NH equivalents corresponds to the NCO content, ie. from 0.1 to 4, preferably from 0.3 to 2.5, moles per mole of Component 1.IA, or the NCO-containing prepolymer is added to the aminoalcohol, so that the amino groups react with the isocyanate. Even in the case of polyurethanes which do not contain triols, variation of the aminoalcohols gives products having an OH functionality of from 2 to 4, the OH groups being predominantly at the chain ends. If the polyurethanes used contain triols, the OH functionality is increased accordingly. This composition is of advantage for film formation and for the final crosslinking of the OH-containing polyurethane with the polyisocyanate. If, in this second reaction stage, the NCO groups are slightly in excess of the NH or NH$_2$ groups, some of the aminoalcohol is incorporated into the molecule and results in a branching point, depending on the aminoalcohol. If an excess of NH groups is used, the aminoalcohol is not completely incorporated into the polymer until the crosslinking reaction has taken place. Hence, by varying the terminal groups, it is possible to match the polymer to the particular requirements, eg. film-forming ability and dispersibility.

The thermoplastic elastomeric OH-containing polyurea-urethanes having the above composition are preferably prepared by a 2-stage process, in solution, in the presence or absence of a catalyst and other assistants and/or additives. It is also possible to prepare these products by the solvent-free batch process. However, because of the possible presence of a triol and the reaction of the amine with NCO groups, gel particles are formed to at least some extent during polyaddition in the absence of a solvent, and the reaction is therefore carried out in general in solution. The risk of complete crosslinking occurring locally, as happens in the case of polyaddition in the absence of a solvent, is usually avoided in the polyaddition in solution.

Preferably used solvents for the preparation of the polyurethanes are cyclic ethers, eg. tetrahydrofuran and dioxane, and cyclic ketones, eg. cyclohexanone. Depending on the field of use, the polyurethanes can of course also be dissolved in another strongly polar solvent, such as dimethylformamide, N-methylpyrrolidone, dimethyl sulfoxide or ethylglycol acetate. It is also possible to mix the above solvents with aromatics, eg. toluene or xylene, or esters, eg. ethyl or butyl acetate.

Examples of suitable catalysts for the preparation of the polyurethane and for the crosslinking reaction are tert.-amines, eg. triethylamine, triethylenediamine, N-methylpyridine and N-methylmorpholine, metal salts, eg. tin octoate, lead octoate and zinc stearate, and organometallic compounds, eg. dibutyl-tin dilaurate. The amount of catalyst to be employed depends on its activity. In general, it has proved advantageous to use from 0.005 to 0.3, preferably from 0.01 to 0.1, parts by weight per 100 parts by weight of polyurethane.

In the 2-stage polyaddition process, the diisocyanate is placed first in the reactor, and Components 1.IA, 1.IB and 1.ID, with or without a catalyst, assistants and additives, in a solvent, are then added at from 20° to 90° C., preferably from 30° to 70° C., in the course of from 0.5 to 5 hours. The components are then allowed to react until the desired NCO content is reached, after which Component 1.IC is added in the 2nd stage, or Component 1.IC is initially introduced and the polymer is then added. In the 2-stage process, the first stage is carried out using an NCO excess, based on Components 1.IA, 1.IB and 1.ID.

The physically drying binder present, as Component 2, in the binder mixture for the novel recording media is a conventional one. Polyurethane elastomers used as Component 2, and their preparation, are described in, inter alia, German Published Applications DAS 2,445,763 and DAS 2,753,694.

Polyurethanes used as high molecular weight binders in the magnetic layer are particularly suitable if they have a K value of from 50 to 70, a blocking point of not less than 120° C., an elongation at break of from 100 to 1,400% (DIN 53,455) and a tensile strength of from 40 to 95 N/mm² (DIN 53,455). If these polyurethanes also possess terminal OH groups which can readily participate in crosslinking, they are particularly advantageous.

The ratio of these Components 1 and 2 in the polyurethane binder mixture used for the novel recording media is from 9:1 to 1:9, preferably from 2:8 to 8:2.

Another advantageous Component 2 of the binder mixture for the novel magnetic recording media is a polyvinylformal binder obtained by hydrolyzing a polymer of a vinyl ester and then reacting the vinyl alcohol polymer with formaldehyde. The polyvinylformals advantageously contain not less than 65, in particular not less than 80, % by weight of vinylformal groups. Suitable polyvinylformals contain from 5 to 13% by weight of vinyl alcohol groups and from 80 to 88% by weight of vinylformal groups, and have a specific gravity of about 1.2 and a viscosity of from 50 to 120 centipoise (cP), measured at 20° C. on a solution of 5 g of polyvinylformal in 100 ml of a 1:1 mixture of phenol and toluene. In addition to polyvinylformal, equally suitable compounds are vinyl chloride/diol monoacrylate, diacrylate, monomethacrylate or dimethacrylate copolymers which can be prepared, for example, in a conventional manner, by solution copolymerization or suspension copolymerization of vinyl chloride and the diol monomethacrylate or monoacrylate. The diol monoacrylate, diacrylate, monomethacrylate or dimethacrylate used for this purpose is obtained by esterifying acrylic acid or methacrylic acid with an appropriate molar amount of an aliphatic diol of 2 to 4 carbon atoms, eg. ethylene glycol, butane-1,4-diol or, preferably propanediol. The propanediol preferably consists of propane-1,3-diol and from 0 to 50% by weight of propane-1,2-diol. The copolymers advantageously contain from 50 to 95% by weight of vinyl chloride and from 5 to 50% by weight of diol acrylate or methacrylate. Particularly suitable copolymers preferably contain from 70 to 90% by weight of vinyl chloride and from 10 to 30% by weight of diol monoacrylate or monomethacrylate. A 15% strength solution of a particularly suitable copolymer, eg. a vinyl chloride/propanediol monoacrylate copolymer in a mixture of equal parts by volume of tetrahydrofuran and dioxane has a viscosity of about 30 cP at 25° C. and a K value according to H. Fikentscher (Cellulosechemie 30 (1931), 58 et seq.) of from 30 to 50, preferably about 40.

Other advantageous Components 2 are phenoxy resins which contain a repeating unit of the formula

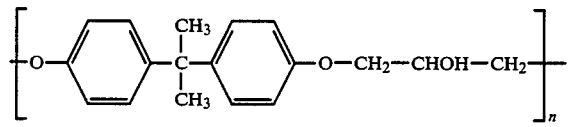

where n is about 100. These are polymers such as are described in German Published Application DAS 1,295,011 and those known under the tradenames ®Epikote, from Shell Chemical Co., or ®Epoxy resin PKHH, from Union Carbide Corporation.

Cellulose ester binders can also be used as Component 2 in the binder mixture described. These are esters of cellulose with a carboxylic acid of 1 to 4 carbon atoms, eg. cellulose acetate, cellulose triacetate, cellulose acetopropionate or cellulose acetobutyrate.

The binder mixture employed for the novel recording media contains Components 1 and the last-mentioned Component 2 in a ratio of from 1:0.8 to 1:0.1, preferably from 1:0.6 to 1:0.2.

Because the binders exhibit a high degree of compatibility with one another, it is possible to vary these components within wide limits, depending on the spectrum of properties and on the requirements which the magnetic layer has to fulfill. Depending on the type of binder required, it is possible to start from a Component 1 which is highly elastomeric after crosslinking has been effected and a hard Component 2, or from a Component 1 which is hard after crosslinking has been effected and a soft Component 2. Mixtures containing not less than 50% of Component 1 are particularly preferred.

The processing of the binder mixture comprising Components 1 and 2 with magnetic materials and assistants into a magnetic dispersion, and the application thereof to the base material to give the novel magnetic recording medium may be carried out in a conventional manner.

The anisotropic magnetic materials which can be used are the conventional ones, but the choice of pigment is a factor which substantially determines the properties of the resulting magnetic layer. Examples of these materials are gamma-iron(III) oxide, finely divided magnetite, non-doped or doped ferromagnetic chromium dioxide or cobalt-modified gamma-iron(III) oxide.

Acicular gamma-iron(III) oxide and ferromagnetic chromium dioxide are preferred. The particle size is in general from 0.2 to 2 μm, preferably from 0.3 to 0.8 μm.

As is conventionally the case, the magnetic layer may also contain small amounts of additives, eg. dispersants and/or lubricants, and fillers, which are admixed during dispersion of the magnetic pigment or during the production of the magnetic layer. Examples of such additives are fatty acids or isomerized fatty acids, eg. stearic acid, or their salts with metals of main groups I to IV of the periodic table of elements, amphoteric electrolytes, eg. lecithin, and fatty acid esters, waxes, silicone oils, conductive carbon, etc. The additives are used in a conventional amount, which is in general less than 10 percent by weight, based on the magnetic layer.

The novel recording medium contains from 1 to 10, in particular from 3 to 6, parts by weight of magnetic material per part by weight of binder mixture. A particular advantage is the fact that the excellent pigment-binding ability of the special polyurethanes permits a high loading of magnetic material in the magnetic layer without the mechanical properties being adversely affected or the service characteristics being noticeably affected.

The non-magnetic and non-magnetizable bases used are conventional rigid or flexible ones, in particular films obtained from linear polyesters, eg. polyethylene terephthalate, which are in general from 4 to 200, in particular from 10 to 36, μm thick. More recently, the use of magnetic layers on paper bases for electronic computing and accounting machines has become important; the novel coating materials can be advantageously used for this purpose, too.

The magnetic recording medium according to the invention can be produced in a conventional manner. Advantageously, a magnetic dispersion is produced in a dispersing apparatus, eg. a tubular ball mill or a stirred ball mill, from the magnetic material and a solution of the binder, with the addition of dispersants and other additives, the polyisocyanate crosslinking agent is mixed in, and the dispersion is filtered and then applied to the non-magnetic base using a conventional coating apparatus, eg. a knife coater. As a rule, the magnetic particles are oriented before the fluid coating mixture has dried on the base; drying is advantageously carried out at from 50° to 90° C. for from 2 to 5 minutes. The magnetic layers can be subjected to a conventional surface treatment, eg. calendering in which the coated base is passed between polished rollers, with the application of pressure and optional heating at from 25° to 100° C., preferably from 60° to 80° C. The thickness of the magnetic layer is in general from 2 to 20, preferably from 4 to 10, μm. Where magnetic tapes are to be produced, the coated films are slit, in the longitudinal direction, to the usual widths.

The crosslinking of the two components of the polyurethane binder mixture with polyisocyanates is essential for achieving the advantageous properties of the novel magnetic recording media. A large number of organic di-, tri- or polyisocyanates or isocyanate prepolymers having a molecular weight of not more than 10,000, preferably from 500 to 3,000, are suitable for effecting crosslinking. Preferred compounds are polyisocyanates which possess more than 2 NCO groups per molecule. Polyisocyanates which are based on toluylene diisocyanate, hexamethylene diisocyanate or isophorone diisocyanate and are formed by polyaddition to diols and triols or by biuret and isocyanurate formation have proved particularly suitable. An adduct of toluylene diisocyanate with trimethylolpropane and diethylene glycol is particularly advantageous.

The amount of added polyisocyanate component corresponds to an OH:NCO ratio of from 1:0.3 to 1:2.0, preferably from 1:0.5 to 1:1.5, based on the OH groups of the polyurethane binder to be crosslinked.

Compared with magnetic recording media obtained using prior art polyurethanes or polyurethane mixtures as binders, the magnetic recording media according to the invention possess improved electroacoustic properties, in particular a higher maximum output level at short and long wavelengths as well as higher sensitivity. For video use, the novel recording media have higher video and color signal-to-noise ratios and exhibit a smaller number of dropouts. Another big advantage is that it is possible with the novel binder to process conventional magnetic materials into homogeneous, highly pigmented dispersions in conventional dispersing apparatus, the operation being easy to carry out and, in particular, requiring very little time and energy. The fact that up to 40% less solvent is required in the dispersing operation should also be singled out. A further advantage is that the crosslinking of the polymers suitable for the novel magnetic recording media results in magnetic layers which are stable even at elevated temperatures and high humidity levels.

In the Examples and Comparative Experiments which follow, parts and percentages are by weight, unless stated otherwise. Parts by volume bear the same relation to parts by weight as the liter to the kilogram.

EXAMPLE A

A solution of 100.05 g of toluylene diisocyanate in 107 g of tetrahydrofuran was heated at 60° C., and one drop of dibutyl-tin dilaurate was added. 150 g of an OH-containing polyester obtained from adipic acid and butane-1,4-diol and having a molecular weight of 1,000 and 41.3 g of hexanediol, dissolved in 200 g of tetrahydrofuran, were added to the above solution in the course of 2½ hours. After one hour, a further drop of dibutyl-tin dilaurate was added. After the NCO content had reached 1.05%, the mixture was cooled to 45° C. and 15.75 g of diethanolamine were then added. The resulting product had a solids content of 50%, and an OH number of 55 and a K value of 24–28.

EXAMPLE 1

100,000 parts of steel balls, 5,040 parts of a 50% strength solution of the polyurea-urethane described in Example A, 8,640 parts of a 12.5% strength tetrahydrofuran solution of a polyester-urethane prepared as described in German Published Application DAS 2,753,694, 200 parts of a dispersant, 166 parts of a lubricant, 16,000 parts of a ferromagnetic chromium dioxide pigment having a mean particle size of 0.5 μm and a coercive force of 50 kA/m and 18,000 parts of tetrahydrofuran were introduced into a steel ball mill having a capacity of 100,000 parts by volume, and the mixture was dispersed for about 24 hours. The magnetic dispersion was then forced under pressure through a filter having a pore size of 5 μm, 1,140 parts of a 75% strength solution of a triisocyanate obtained from 3 moles of toluylene diisocyanate and 1 mole of trimethylolpropane were added while stirring, and immediately afterward the dispersion was applied to a 15 μm thick polyethylene terephthalate film. The coated film was passed through a magnetic field to orient the magnetic particles, and was then dried at from 60° to 90° C. The magnetic coating was then calendered by passing the coated web between heated rollers (60° C.; nip pressure 20 kg/cm), after which treatment the coating was about 4 μm thick. The coated film was then slit into ½ inch wide tapes.

Using a VHS recorder from the Victor Company of Japan, these magnetic recording media intended for the video sector were tested for the following properties, against a reference tape (OdB):

(1) Video signal-to-noise ratio (video S/N): ratio of the luminance signal of a 100% white image to the noise level, measured using the UPSF noise voltage meter from Rohde and Schwarz ($\geq$ 100 kHz).

(2) Color signal-to-noise ratio (color S/N): ratio of the color signal of a red area to the noise level, measured using the UPSF noise voltage meter from Rohde and Schwarz (100 kHz–3 MHz).

(3) Dropouts: The number, per minute, of drops in the level of the output signal of 20 dB lasting more than 15 μsec.

The results of the tests are shown in Table 1.

COMPARATIVE EXPERIMENT

The procedure described in Example 1 was followed, except that the polyurea-urethane described in Example A was replaced by a polyester-urethane prepared as described in German Published Application DAS 2,753,694. Tetrahydrofuran was used as the solvent, and the mixture was processed as described in Example 1. The results of the tests are shown in Table 1.

TABLE 1

| | Video S/N [dB] | Color S/N [dB] | Dropouts/min |
|---|---|---|---|
| Example 1 | 1 | 1 | 12 |
| Comparative experiment | 0 | 0 | 30 |

EXAMPLE B

A solution of 108.75 g of toluylene diisocyanate in 108 g of tetrahydrofuran was heated at 60° C., and one drop of dibutyl-tin dilaurate was added. 150 g of an OH-containing polyester obtained from adipic acid and butane-1,4-diol and having a molecular weight of 1,000 and 18.6 g of ethylene glycol and 4.47 g of trimethylolpropane, dissolved in 200 g of tetrahydrofuran, were added to the above solution in the course of 2½ hours. After one hour, a further drop of dibutyl-tin dilaurate was added. After the NCO content had reached 1.78%, the mixture was cooled to 45° C. and 20.25 g of diethanolamine were then added. The resulting product had a solids content of 50%, and an OH number of 91 and a K value of 24.

EXAMPLE 2

102 kg of tetrahydrofuran, 26.3 kg of a 50% strength solution of the polyurea-urethane described in Example B, 27.8 kg of a polyester-urethane solution prepared as described in German Published Application DAS 2,753,694, 100 kg of a ferromagnetic chromium dioxide having a mean needle length of 0.5 μm, 2.5 kg of zinc oleate, 0.25 kg of a commercial silicone oil and 1 kg of n-butyl stearate were introduced into a steel ball mill having a capacity of 600 parts by volume and containing 600 kg of steel balls with a diameter of from 4 to 6 mm, and the mixture was dispersed for 36 hours. The dispersion was then filtered under pressure, 0.039 part, per part of dispersion, of a 75% strength solution of a triisocyanate obtained from 3 moles of toluylene diisocyanate and 1 mole of trimethylolpropane was added while stirring, and immediately afterward the dispersion was applied to a 15 μm thick polyethylene terephthalate film. The coated film was passed through a magnetic field to orient the magnetic particles, dried at from 50° to 80° C. and then passed between heated rollers under pressure (60° C.; nip pressure 200 kg/cm) to consolidate and smoothen the magnetic layer.

The magnetic properties were measured in a magnetic field of 160 kA/m. The film was slit into 3.81 mm wide tapes, and the electroacoustic properties were determined according to DIN 45,401, 45,403 and 45,512 (sheet 12), against reference tape C 401 R. The results of the measurements are shown in Table 2.

TABLE 2

| | Example 2 |
|---|---|
| Layer thickness [μm] | 4.9 |
| Remanence [mT] | 176 |
| Orientation ratio | 3.1 |
| Sensitivity at long wavelengths $E_T$ 315 Hz [Δd B] | 1.2 |
| Sensitivity at short wavelengths $E_H$ 10 kHz [Δd B] | 2.6 |
| Maximum output level at long wavelengths $A_T$ 315 Hz [Δd B] | 3.2 |
| Maximum output level at short wavelengths $A_H$ 10 kHz [Δd B] | 2.1 |

EXAMPLE 3

100,000 parts of steel balls, 5,760 parts of a 50% strength solution of the polyurea-urethane described in Example A, 3,600 parts of a 20% strength solution of a phenoxy resin prepared from epichlorohydrin and bisphenol A, 200 parts of a dispersant, 166 parts of a lubricant, 16,000 parts of a ferromagnetic chromium dioxide pigment having a mean particle size of 0.5 μm and a coercive force of 50 kA/m and 18,000 parts of tetrahydrofuran were introduced into a steel ball mill having a capacity of 100,000 parts by volume, and the mixture was dispersed for about 24 hours. The magnetic dispersion was then forced under pressure through a filter having a pore size of 5 μm, 1,140 parts of a 75% strength solution of triisocyanate obtained from 3 moles of toluylene diisocyanate and 1 mole of trimethylolpropane were added while stirring, and immediately afterward the dispersion was applied to a 15 μm thick polyethylene terephthalate film. The coated film was passed through a magnetic field to orient the magnetic particles, and was then dried at from 60° to 90° C. It was then passed between heated rollers (60° C.; nip pressure 200 kg/cm) to consolidate and smoothen the magnetic layer. The latter was 4 μm thick. The coated film was then slit into ½ inch wide tapes.

The video properties were measured as described in Example 1. The results of the measurements are shown in Table 3.

COMPARATIVE EXPERIMENT

The procedure described in Example 3 was followed, except that the polyurea-urethane described in Example A was replaced by a tetrahydrofuran solution of a polyester-urethane prepared as described in German Published Application DAS 1,295,011, by the melt-condensation process, and 1 part of a phenoxy resin as used in Example 1. The mixture was processed as described in Example 3, and the results of the tests are shown in Table 3.

TABLE 3

|  | Video S/N [dB] | Color S/N [dB] | Dropouts/min |
|---|---|---|---|
| Example 3 | 1 | 2 | 10 |
| Comparative experiment | 0 | 0 | 30 |

EXAMPLE 4

102 kg of tetrahydrofuran, 26.3 kg of a 50% strength solution of the polyurea-urethane described in Example B, 28 kg of a 20% strength solution of a phenoxy resin prepared from epichlorohydrin and bisphenol A, 100 kg of a ferromagnetic chromium dioxide having a mean needle length of 0.5 μm, 2.5 kg of zinc oleate, 0.25 kg of a commercial silicone oil and 1 kg of n-butyl stearate were introduced into a steel ball mill having a capacity of 600 parts by volume and containing 600 kg of steel balls with a diameter of from 4 to 6 mm, and the mixture was dispersed for 36 hours. The dispersion was then filtered under pressure, 0.039 part, per part of dispersion, of a 75% strength solution of a triisocyanate obtained from 3 moles of toluylene diisocyanate and 1 mole of trimethylolpropane was added while stirring, and immediately afterward the dispersion was applied to a 15 μm thick polyethylene terephthalate film. The coated film was passed through a magnetic field to orient the magnetic particles, dried at from 50° to 80° C. and then passed between heated rollers under pressure (60° C.; nip pressure 200 kg/cm) to consolidate and smoothen the magnetic layer.

The magnetic properties were measured in a magnetic field of 160 kA/m.

The film was slit into 3.81 mm wide tapes, and the electroacoustic properties were tested according to DIN 45,401, 45,403 and 45,512 (sheet 12), against reference tape C 401 R. The results of the measurements are shown in Table 4.

EXAMPLE 5

The procedure described in Example 4 was followed, except that the phenoxy resin was replaced by a polyvinylformal comprising 82% of vinylformal units, 12% of vinyl acetate units and 6% of vinyl alcohol units. The results of the measurements are shown in Table 4.

EXAMPLE C

A solution of 53.1 g of toluylene diisocyanate and 75 g of diphenylmethyl diisocyanate in 229 g of tetrahydrofuran was heated at 60° C., and one drop of dibutyl-tin dilaurate was added. 250 g of an OH-containing polyester obtained from adipic acid and butane-1,4-diol and having a molecular weight of 1,000 and 27.7 g of hexanediol and 1.34 g of trimethylolpropane, dissolved in 200 g of tetrahydrofuran, were added to the above solution in the course of 2½ hours. After one hour, a further drop of dibutyl-tin dilaurate was added. After the NCO content had reached 1.05%, the mixture was cooled to 45° C. and 22.05 g of diethanolamine were then added. The resulting product had a solids content of 50%, and an OH number of 55 and a K value of 30.

EXAMPLE 6

The procedure described in Example 4 was followed, except that the binder used was a mixture of 26.3 kg of a 50% strength solution of the polyurea-urethane described in Example C and 7.5 kg of a 20% strength solution of a cellulose acetobutyrate (CA-381-2 from Eastman Kodak, Rochester).

The results of the measurements are shown in Table 4.

TABLE 4

|  | Example 4 | Example 5 | Example 6 |
|---|---|---|---|
| Layer thickness [μm] | 5.3 | 5.0 | 4.9 |
| Remanence [mT] | 164 | 168 | 172 |
| Orientation ratio | 3.1 | 3.0 | 3.0 |
| Sensitivity at long wavelengths $E_T$ 315 Hz [Δd B] | 0.8 | 1.0 | 1.2 |
| Sensitivity at short wavelengths $E_H$ 10 kHz [Δd B] | 2.0 | 2.2 | 2.0 |
| Maximum output level at long wavelengths $A_T$ 315 Hz [Δd B] | 2.1 | 2.3 | 2.6 |
| Maximum output level at short wavelengths $A_H$ 10 kHz [Δd B] | 1.6 | 1.8 | 2.2 |

We claim:

1. A magnetic recording medium which comprises a magnetic layer which is applied to a non-magnetic base and consists essentially of a dispersion of an anisotropic magnetic material in a mixture of an OH-containing polyurethane compound, which has been finally crosslinked with a polyisocyanate, and a physical drying binder, wherein the binder mixture consists essentially of Component 1, which is a low molecular weight OH-containing polyurea-urethane which has an OH number of from 30 to 160 and an average number molecular weight of 1,500 to 40,000 and is obtained from 1.IA 1 mole of a polydiol having a molecular weight of from 400 to 4,000, 1.IB from 0.2 to 10 moles of a diol of 2 to 18 carbon atoms, 1.IC from 0.1 to 4 moles of a primary or secondary aminoalcohol of 2 to 20 carbon atoms, and 1.II from 1.20 to 13 moles of a diisocyanate of 6 to 30 carbon atoms, the proportion of NCO groups in the diisocyanate being from 65 to 95%, based on Components 1.IA to 1.IC, of the equivalent amount of OH and NH groups, with the proviso that the non-pigmented crosslinked film has a tensile strength greater than 15 N/mm², an elongation at break greater than 50%, a modulus of elasticity greater than 150 N/mm² and a pendulum hardness of from 30 to 140 sec, and Component 2, which is a physically drying binder.

2. A magnetic recording medium which comprises a magnetic layer which is applied to a non-magnetic base and consists of a dispersion of an anisotropic magnetic material in a mixture of an OH-containing polyurethane compound, which has been finally crosslinked with a polyisocyanate, and a physical drying binder, wherein the binder mixture consists essentially of Component 1, which is a low molecular weight OH-containing polyurea-urethane which has an OH number of from 30 to 160 and an average number molecular weight of 1,500 to 40,000 and is obtained from 1.IA 1 mole of a polydiol having a molecular weight of from 400 to 4,000, 1.IB from 0.2 to 9 moles of a diol of 2 to 18 carbon atoms, 1.IC from 0.1 to 4 moles of a primary or secondary aminoalcohol of 2 to 20 carbon atoms, 1.ID from 0.01 to 1 mole of a triol of 3 to 18 carbon atoms, and 1.II from 1.25 to 13 moles of a diisocyanate of 6 to 30 carbon atoms, the proportion of NCO groups in the diisocyanate being from 65 to 95%, based on Components 1.IA to 1.ID, of the equivalent amount of OH and NH groups, with the proviso that the non-pigmented crosslinked film has a tensile strength greater than 15 N/mm², an elongation at break greater than 50%, a modulus of elasticity greater than 150 N/mm² and a pendulum hardness of from 30 to 140 sec, and Component 2, which is a physically drying binder.

3. A magnetic recording medium as defined in claim 1, wherein Component 2 consists essentially of a high molecular weight thermoplastic linear polyurethane which is soluble in tetrahydrofuran and is obtained from 2.A 1 mole of a polyesterol having a molecular weight of from 400 to 4,000, 2.B from 0.3 to 15 moles of a straight-chain aliphatic diol of 2 to 10 carbon atoms, 2.C from 0 to 1.5 moles of a triol of 3 to 10 carbon atoms, and from 1.25 to 17 moles of a diisocyanate of 6 to 30 carbon atoms, the amount of NCO groups being about equivalent to the amount of OH groups in Components 2.A, 2.B and 2.C together, with the proviso that the non-pigmented film has a tensile strength of from 40 to 95 N/mm² and an elongation at break of from 100 to 1,400%, and in which the ratio of Component 1 to Component 2 is from 9:1 to 1:9.

4. A magnetic recording medium as defined in claim 1, wherein Component 2 consists essentially of a polyvinylformal binder containing not less than 65% of vinylformal groups, or of a copolymer of 50–95% by weight of vinyl chloride and 5–50% by weight of a monoester or diester of an aliphatic diol of 2 to 4 carbon atoms with acrylic acid or methacrylic acid, or of a phenoxy resin of the formula

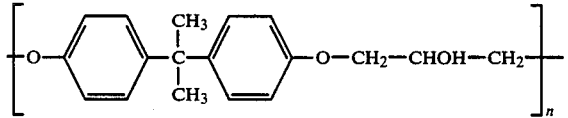

where n is about 100, or of a diester and/or triester of cellulose with one or more carboxylic acids of 1 to 4 carbon atoms, the ratio of Component 1 to Component 2 being from 1:0.8 to 1:0.1.

* * * * *